US008583480B2

(12) United States Patent
Byrne

(10) Patent No.: US 8,583,480 B2
(45) Date of Patent: Nov. 12, 2013

(54) SYSTEM, PROGRAM PRODUCT, AND METHODS FOR SOCIAL NETWORK ADVERTISING AND INCENTIVES FOR SAME

(75) Inventor: Patrick Byrne, Park City, UT (US)

(73) Assignee: Overstock.com, Inc., Salt Lake City, UT (US)

( * ) Notice: Subject to any disclaimer, the term of this patent is extended or adjusted under 35 U.S.C. 154(b) by 400 days.

(21) Appl. No.: 12/341,847

(22) Filed: Dec. 22, 2008

(65) Prior Publication Data

US 2009/0164323 A1 Jun. 25, 2009
US 2011/0004525 A2 Jan. 6, 2011

Related U.S. Application Data

(60) Provisional application No. 61/031,039, filed on Feb. 25, 2008, provisional application No. 60/016,242, filed on Dec. 21, 2007.

(51) Int. Cl.
*G06Q 30/02* (2012.01)

(52) U.S. Cl.
USPC ............ 705/14.4; 705/14.41; 705/14.49; 705/14.69; 705/14.72; 705/14.73

(58) Field of Classification Search
USPC ........................................... 705/14
See application file for complete search history.

(56) References Cited

U.S. PATENT DOCUMENTS

| | | |
|---|---|---|
| 5,873,080 A | 2/1999 | Coden et al. |
| 5,913,215 A | 6/1999 | Rubinstein et al. |
| 5,987,446 A | 11/1999 | Corey et al. |
| 6,078,914 A | 6/2000 | Redfern |
| 6,185,558 B1 | 2/2001 | Bowman et al. |
| 6,275,820 B1 | 8/2001 | Chandra et al. |
| 6,370,527 B1 | 4/2002 | Singhal |
| 6,434,556 B1 | 8/2002 | Levin et al. |
| 6,601,061 B1 | 7/2003 | Holt et al. |
| 6,701,310 B1 | 3/2004 | Sugiura et al. |
| 6,728,704 B2 | 4/2004 | Mao et al. |
| 7,117,207 B1 | 10/2006 | Kerschberg et al. |
| 7,127,416 B1 | 10/2006 | Tenorio |
| 7,165,091 B2 | 1/2007 | Lunenfeld |
| 7,216,115 B1 | 5/2007 | Walters et al. |

(Continued)

OTHER PUBLICATIONS

Co-pending U.S. Appl. No. 12/345,453, filed Dec. 29, 2008, titled "System, Program Product, and Method of Electronic Communication Network Guided Navigation".

*Primary Examiner* — John G Weiss
*Assistant Examiner* — Vincent Cao
(74) *Attorney, Agent, or Firm* — Clayton, Howarth & Cannon, P.C.

(57) ABSTRACT

Program product, systems, and methods of providing to social network websites advertising and incentives from an electronic retailer, are provided. A system can include a social network website displaying social network content and also displaying a link that reroutes the consumer to an electronic retailer website when the consumer clicks on the link. The system can also include program product for tracking purchase and other information about the consumer by the electronic retailer, and generating a commission for the provider of the social network website based on the tracked information about the consumer. The link can be embedded within the social network content or the link can be part of an advertisement and displayed adjacent the social network content. Also, a product featured in the advertisement can be affiliated with one main subject of the social network content.

20 Claims, 11 Drawing Sheets

(56) References Cited

U.S. PATENT DOCUMENTS

| | | |
|---|---|---|
| 2001/0044751 A1* | 11/2001 | Pugliese et al. ............... 705/26 |
| 2004/0006509 A1* | 1/2004 | Mannik et al. ............... 705/14 |
| 2005/0131837 A1 | 6/2005 | DeSanctis |
| 2005/0203888 A1 | 9/2005 | Woosley et al. |
| 2005/0273378 A1 | 12/2005 | MacDonald-Korth |
| 2006/0031240 A1 | 2/2006 | Eyal et al. |
| 2006/0069623 A1 | 3/2006 | MacDonald-Korth |
| 2006/0085251 A1 | 4/2006 | Greene |
| 2006/0173817 A1 | 8/2006 | Chowdhury et al. |
| 2006/0259360 A1* | 11/2006 | Flinn et al. ............... 705/14 |
| 2007/0073641 A1 | 3/2007 | Perry et al. |
| 2007/0078726 A1 | 4/2007 | MacDonald-Korth |
| 2007/0192181 A1* | 8/2007 | Asdourian ............... 705/14 |
| 2007/0260520 A1* | 11/2007 | Jha et al. ............... 705/14 |

\* cited by examiner

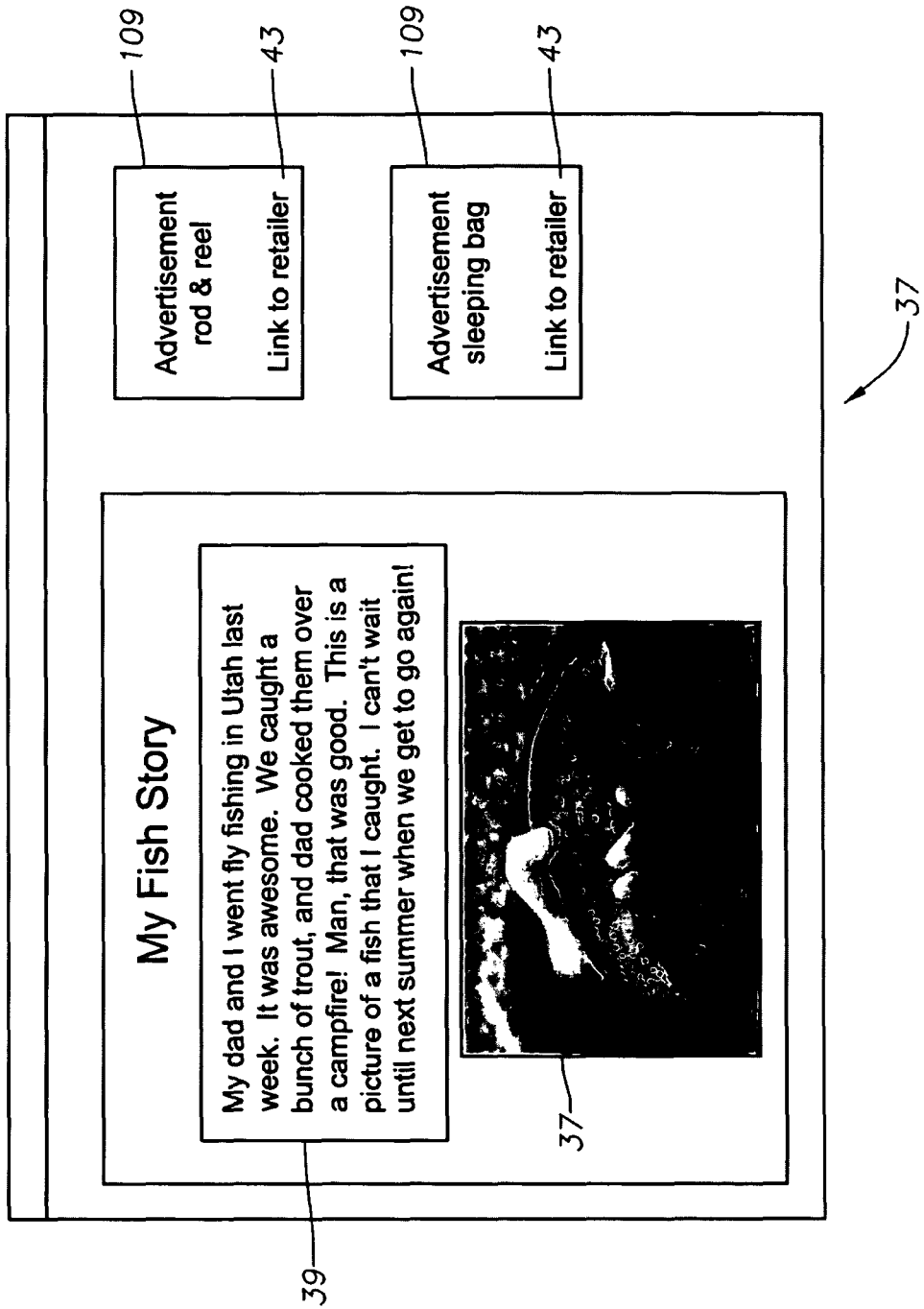

SYSTEM, PROGRAM PRODUCT, AND METHODS FOR SOCIAL NETWORK ADVERTISING AND INCENTIVES FOR SAME

RELATED APPLICATIONS

This application is a non-provisional of and claims the benefit of and priority to U.S. Provisional Patent Application No. 61/031,039, filed on Feb. 25, 2008, titled "System, Program Product, and Methods for Social Network Advertising and Incentives for Same," and claims the benefit of and priority to U.S. Provisional Patent Application No. 61/016,242, filed Dec. 21, 2007, titled "Website Affiliate Incentive Product, System, and Associated Methods," each incorporated herein by reference in its entirety.

BACKGROUND

1. Field of the Invention

The present invention relates to electronic commerce through communication networks, and more particularly, to systems, program products, and methods for managing advertisement development and placement on social network website.

2. Description of the Related Art

Electronic retailers, like their brick and mortar counterparts, like to attract consumers to their storefronts. In addition, electronic retailers like to encourage consumers to linger at their storefronts and to entice the consumer to make purchases. It is recognized that the conversational and participatory nature of social media promotes lingering and follow-up visits, as illustrated by the recent success of sites such as MySpace, Facebook, YouTube, and Flickr. Furthermore, such social media can offer unique opportunities for consumers to interact with products and demonstrate the use of products in creative, humorous, fantastic, and interesting ways by publishing consumer-produced pictures, video, and audio clips. These demonstrations are often persuasive expressions of appreciation in that they often take place in real situations with real people under real conditions, as opposed to taking place in a studio with scripted actors under artificial conditions.

Search engine results can be instrumental in driving a significant portion of internet traffic to their storefronts. Overall, however, such driving force is not done so proportionally. Various websites are favored by the search engines over others. That is, some websites are more attractive to the search engines, than others, depending upon their content. As such, recognized by the inventor is the need to develop or obtain access to content that is more attractive to the various search engines. Also recognized is that social media tends to attract very favorable natural language search results from the various search engines. Such social media generally includes blogs and other social network websites having any communications format where users publish the content, such as, for example, internet forums, message boards, weblogs, wikis, podcasts, audio, pictures, and video. The favorable natural language search results for social media may be at least in part due to the significant context provided within social media both in terms of the amount and nature of the content.

Although such social network websites, such as MySpace, Facebook, YouTube, and Flickr, and numerous individual blogs, are very popular in terms of overall internet traffic, inherent in social networks, however, is the challenge of motivating authors and content providers to create and offer content. As Milton Friedman popularized, "There is no such thing as a free lunch." To monetize, or in many cases subsidize, their efforts, many providers of social network websites attempt to obtain sponsorship or advertising revenue.

Under conventional advertising models, advertisers typically sponsor content on various websites using cost-per-viewing or cost-per-click-through to determine the value of the advertising by estimating the amount of traffic to the website. That is, under the conventional models, advertisers pay for impressions or click-throughs. The inventor has recognized that many advertisers can be uncomfortable assigning a value to an impression of or a click-through from an individual blog or other social network website and that the conventional models for advertising on social network websites, therefore, underperform. Accordingly, the inventor has recognized a need in the art to provide incentives and commissions for third-party content development for a website of an electronic retailer.

The inventor has further recognized that an electronic retailer has the ability to better value the advertising on a social network website by tracking behavioral information about a consumer from click-through to purchase and by generating commissions to content providers, social network providers, and/or both, in response to actual consumer behavior, as opposed to relying exclusively on impressions or click-throughs. The inventor has also recognized numerous advantages with an advertising model that directly associates social network websites with an electronic retailer.

SUMMARY OF INVENTION

In view of the foregoing, various embodiments of the present invention advantageously provide products, systems, and methods of providing to social network websites advertising and incentives from an electronic retailer. Various embodiments of the present invention provide a model for advertising on a social network website by an electronic retailer tracking a consumer from click-through to purchase and generating commissions in response to actual consumer behavior, as opposed to relying exclusively on impressions or click-throughs. Embodiments of the present invention advantageously reduce the risk to the advertiser by eliminating speculative advertising purchases. Moreover, various embodiments of the present invention provide an inexpensive, quantitative approach to determining the advertising value of a social network website. As such, according to various embodiments of the present invention, web-based sales are generated by electronic retailers advertising on social network websites, and electronic retailers provide incentives to providers of a social network websites and/or content providers in the form of commissions.

Various embodiments of the present invention can unite social media content provided by third-party content providers with items for sale from an electronic retailer. According to an example of such an embodiment of the present invention, social media content and items for sale are first associated within an electronic retailer computer. The social media content and advertisements for the items for sale then are combined and formatted in a common website. The social media content and advertisements for the items for sale are jointly displayed to a consumer so that a consumer can choose to purchase an item for sale after viewing at least a portion of the social media content. When a consumer purchases an item through an advertisement associated with the social media content, a sales commission for the third-party content provider is generated. Thus, according to such embodiments of the present invention, web-based sales are generated by social media content, and the provision of social media content is incentivized by sales commissions offered by an electronic retailer.

Various embodiments of the present invention provide a method of advertising on a social network website by an electronic retailer. According to an example of an embodiment of the present invention, such a method includes displaying social network content on a website, defined as a social network website, viewable on a computer by a consumer, as understood by those skilled in the art. The social network content can include a video segment with audio, a video segment without audio, an audio segment, a picture, text, or a combination thereof. The method further includes displaying a link on the social network website to a website of an electronic retailer and rerouting the consumer from the social network website to the electronic retailer website when the consumer clicks on the link on the social network website, as understood by those skilled in the art. The method continues with the electronic retailer tracking information about the consumer. Such tracked information can include the link on the social network website clicked by the consumer, duration of time the consumer spends viewing the electronic retailer website, duration of time the consumer spends viewing other electronic retailer website web pages, movements by the consumer within the electronic retailer website, the number of times the consumer returns to the electronic retailer website during an established time period, information regarding purchases by the consumer from the electronic retailer website, and other information as understood by those skilled in the art. In addition, the method also includes generating a commission for the social network website provider and/or a content provider based on the tracked information about the consumer to thereby encourage additional display of additional social network content having at least one link to the electronic retailer website associated therewith. That is, the method can advantageously provide a model for advertising on a social network website by an electronic retailer that generates commissions in response to actual consumer behavior, as opposed to relying exclusively on impressions or click-throughs.

According to an embodiment of the present invention, the link can be embedded within the social network content, or the link can be part of an advertisement and displayed adjacent the social network content. In addition, as understood by those skilled in the art, an advertisement containing the link can feature a product available from the electronic retailer related to the social network content. That is, the product featured in the advertisement can be affiliated with one main subject of the social network content, as understood by those skilled in the art.

In an example of an embodiment of the present invention, a social network website can contain a narrative about a particular father-son fly fishing trip on a named river in a certain state. The narrative can also, for example, be illustrated by pictures taken during the trip. The social network website can display adjacent the narrative, for example, an advertisement for the rod and reel as used by the father in the narrative, the sleeping bag as used by the son, or a reservation to hire the services of the fishing guide's outfit. When a consumer views the narrative on the social network website, clicks the link in the advertisement to purchase the rod and reel, is rerouted to the website of the electronic retailer, and completes a purchase, the provider of the social network website earns a sales commission. In this embodiment, the provider of the social network website is the son (or father) in the narrative and also the author of the content. In another embodiment, the website provider is an intermediary. For example, in an example of another embodiment of the present invention, the content provider is the son (or father) in the narrative and also the author of the content. According to such embodiments of the present invention, the provider of the social network website and/or content provider is incentivized to publish the narrative in exchange for the commissions.

In another example of an embodiment of the present invention, the social network content can be an amateur video of teenagers performing tricks at a skate park. Adjacent the content can be, for example, advertisements for a Mountain Dew t-shirt which one of the acrobats is wearing, a book on skateboarding, and a Tony Hawk video game. As understood by those skilled in the art, each advertisement can include a link to the electronic retailer website. Alternately, the advertisements can all be in a family, e.g., all related to skateboarding equipment, according to an embodiment of the present invention. When a consumer views the narrative on the social network website, clicks a link in the advertisement, is rerouted to the website of the electronic retailer, and spends an established amount of time at the website of the electronic retailer (whether or not the consumer ultimately completes a purchase), the provider of the social network website earns a commission based on the tracked behavior of the consumer.

In yet another example of an embodiment of the present invention, the social network website can contain a narrative about the proper method for training a pet dog. When a consumer views the content on a website, the website displays a link to the associated electronic retailer. After viewing the narrative, the consumer may decide to click on the link to the associated electronic retailer and purchase a product, which may or may not be related to the content of the narrative the consumer viewed. When the consumer completes the transaction with the electronic retailer, the content provider earns a commission. In this example, the social network content provider is the author of the content. Such embodiments of the present invention incentivize the author to write and publish the narrative in exchange for commissions.

According to an example of embodiment of the present invention, a search by a consumer using a search engine can result in the displaying of the social network website to the consumer. Because the social network website provides a link to electronic retailer website, the search by a consumer using a search engine can result in displaying to the consumer links to the electronic retailer website. Therefore, various embodiments of the present invention include an electronic retailer obtaining more favorable results from search engines as a function of advertising on social network websites. In the embodiment above, for example, a consumer's search consisting of the words "fly fishing" and the name of the river in a certain state can therefore return the social network website, including the advertisements containing the links to the electronic retailer's website, due to the social network content.

Various embodiments of the present invention include administering an affiliate program of social network websites. In addition to providing commissions, the electronic retailer can offer recommendations to the affiliated social network website providers and access to specials and promotions as benefits of the program. As an example, affiliated social network websites may have an exclusive availability to provide links to products associated with an anticipated summer blockbuster, according to an embodiment of the present invention.

Because the electronic retailer can track information about the consumer, as understood by those skilled in the art, the social network website can obtain a sales commission when a consumer is rerouted to the electronic retailer website, declines to purchase an item initially, returns to the electronic retailer website within an established period of time, and then completes a purchase, according to an embodiment of the present invention. Alternately, as understood by those skilled in the art, the social network website can obtain a commission when a consumer is rerouted to the electronic retailer website, declines to purchase an item initially, but repeatedly returns to the electronic retailer website within an established period of time, becoming a regular shopper of the electronic retailer, according to another embodiment of the present invention.

In addition, various embodiments of the present invention provide the electronic retailer an ability to track consumer interaction with the content and change the items for sale associated with the content based on the data gathered and other data, such as inventories, profit margins, and prices of the items for sale. Thus, when an item is sold out or on back order, that item is no longer advertised along side the social media content. Alternately, if the social media content fails to provide sufficient sales for a particular item, the advertisement for that item may be replaced by an advertisement for a different item, according to embodiments of the present invention.

Various embodiments of the present invention also provide a system of advertising on a social network website by an electronic retailer. According to an example of an embodiment of the present invention, such a system includes an electronic retailer computer, one or more remote social network website computers, and one or more remote consumer computers, all remote from and in communication with each other through an electronic communication network. The social network website computer includes a program product stored in a tangible computer medium that is readable by the social network website computer to perform various operations. The operations can include displaying social network content on a website viewable on the consumer computer, displaying a link on the social network website to a website of an electronic retailer, and rerouting the consumer from the social network website to the electronic retailer website when the consumer clicks on the link on the social network website.

The electronic retailer computer can include a program product stored in a tangible computer medium that is readable by the electronic retailer computer to perform the operation of tracking information about the consumer by the electronic retailer and generating a commission for the provider of the social network website and/or the provider of the social network content if not provided by the social network website, based on the tracked information about the consumer, to thereby encourage additional display of additional social network content having at least one link to the electronic retailer website associated therewith. Such tracked information can include the link on the social network website clicked by the consumer, duration of time the consumer spends viewing the linked electronic retailer website web page, duration of time the consumer spends viewing other electronic retailer website web pages, movements by the consumer within the electronic retailer website, the number of times the consumer returns to the electronic retailer website during an established time period, information regarding purchases by the consumer from the electronic retailer website, and other information as understood by those skilled in the art.

In addition to generating web-based sales and incentivizing content development for a website, various embodiments of the present invention provide methods and systems positioned to generate web-based sales. According to an example of an embodiment of the present invention, such a system includes an electronic retailer computer, one or more remote content provider computers in communication with the electronic retailer computer through an electronic communication network, and one or more remote consumer computers. The electronic retailer computer includes social media content received from a content provider computer and a website generation program product stored in a tangible computer medium that is readable by the electronic retailer computer. The website generation program product associates the content with items for sale (e.g., products) and correspondingly automatically generates and formats a website with the content adjacent related advertisements.

Specifically, the website generation program product can cause the electronic retailer computer to perform the operations of receiving social network content from a content provider, initiating a search of a database of for products for sale responsive to receiving the social network content, to identify products related to the received social network content, and responsively generating the social network website to include: the social network content; an advertisement displayed adjacent the social network content so that the consumer can view the advertisement at the same time as at least a portion of the social network content; and a link to an electronic retailer website web page featuring at least one product affiliated with at least one main subject of the social network content. The consumer computer displays the website generated by the electronic retailer computer so that a consumer can choose to purchase an item after viewing at least a portion of the content.

In addition, various embodiments of the system include generating a sales commission for the third-party content provider based on the behavior of the consumer with respect to the electronic retailer, whether or not the consumer purchases an item.

Various embodiments of the present invention also include a program product stored in a tangible computer medium implementing the methods and features described herein. For example, a program product according to an embodiment of the present invention can include instructions that when executed by a computer, cause the computer to perform various operations including displaying social network content including one or more of the following: a video segment with audio, a video segment without audio, an audio segment, a picture, and text, on a social network website, and displaying a link on the social network website to a website of an electronic retailer. The link can advantageously be part of an advertisement for a product affiliated with a main subject of the social network content selected for association therewith by one or more of the following: a provider of the social network website and a provider of the social network content, with the advertisement displayed adjacent the social network content so that the consumer can view the advertisement at the same time as at least a portion of the social network content. The operations can also include rerouting the consumer from the social network website to the electronic retailer website when the consumer clicks on the link on the social network website.

For example, a program product according to an embodiment of the present invention can include instructions that when executed by a computer, cause the computer to perform various operations including tracking information about a consumer by the electronic retailer, and generating a commission for one or more of the following: a provider of the social network website and a provider of the social network content, based on the tracked information about the consumer, to thereby encourage additional display of additional social network content having at least one link to the electronic retailer website associated therewith. The tracked information can include an indication of a link on a social network website clicked by the consumer, duration of time the consumer spends viewing a electronic retailer website web page, duration of time the consumer spends viewing other electronic retailer website web pages, movements by the consumer within the electronic retailer website, number of times the consumer returns to the electronic retailer website during an established time period, and information regarding purchases by the consumer from the electronic retailer website. The operations can also include generating statistical data for an aggregation of tracked information for multiple consumers responsive to the tracked information for a plurality of consumers, and recommending a second link to a particular product to a provider of a social network website and/or the provider of the social network content (if not also the provider of the social network website) by the electronic retailer by the electronic retailer for inclusion with the social network content based on the generated statistical data.

BRIEF DESCRIPTION OF DRAWINGS

So that the manner in which the features and benefits of the invention, as well as others which will become apparent, may be understood in more detail, a more particular description of the invention briefly summarized above may be had by reference to the embodiments thereof which are illustrated in the appended drawings, which form a part of this specification. It is also to be noted, however, that the drawings illustrate only various embodiments of the invention and are therefore not to be considered limiting of the invention's scope as it may include other effective embodiments as well.

FIG. 13 is a partial schematic diagram of a social network website according to an embodiment of the present invention.

DETAILED DESCRIPTION OF INVENTION

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout. Prime notation, if used, indicates similar elements in alternative embodiments.

Embodiments of the present invention provide an inexpensive, quantitative approach to determining the advertising value of a website, including a social network website, to an electronic retailer. Under existing models, advertisers pay for impressions or clicks-throughs. Under embodiments of the present invention, an electronic retailer advantageously pays commissions to the provider of a website, including a social network website, based on actual consumer behavior of a consumer, including purchase information.

Figure 1:
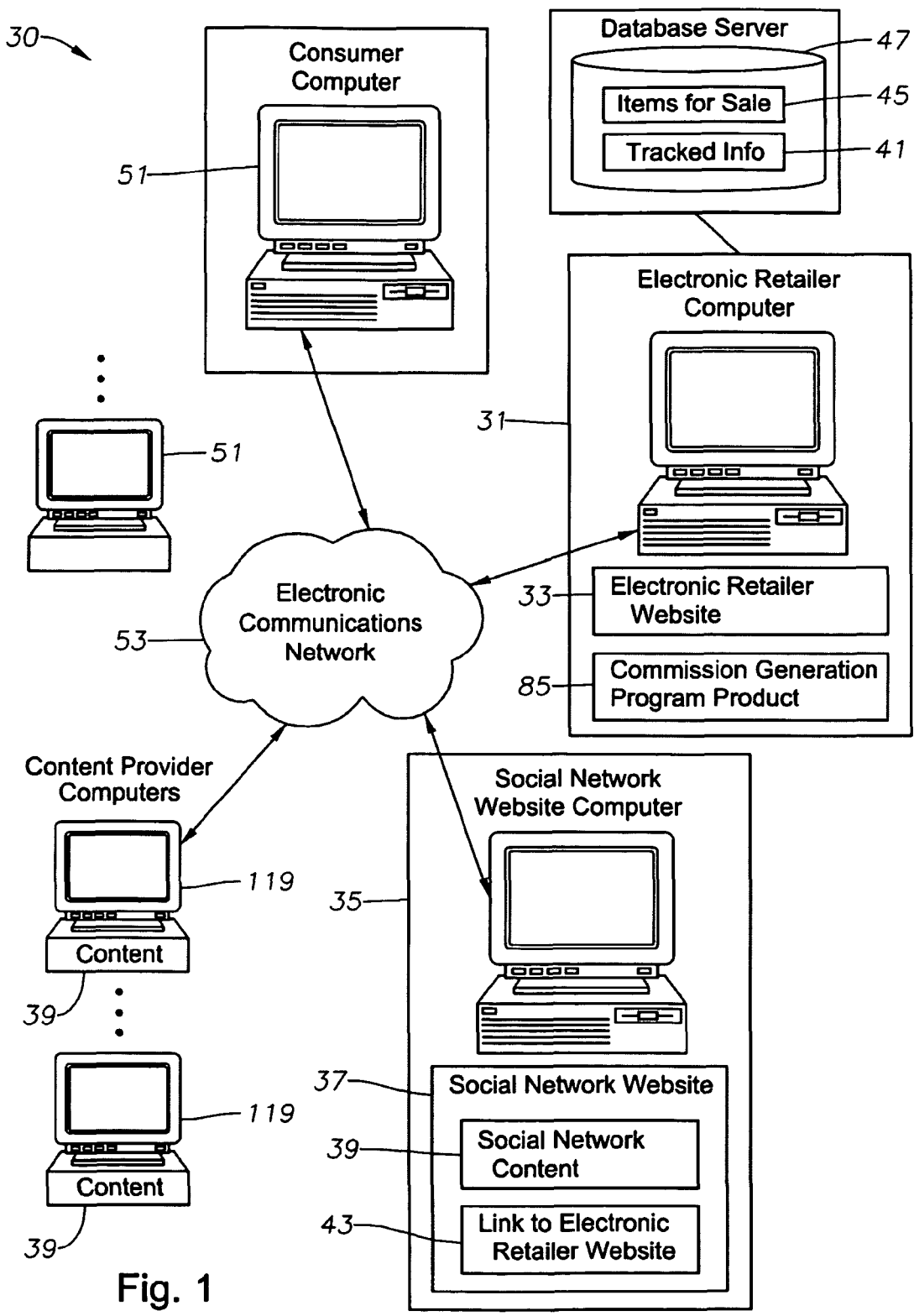
FIG. 1 is a schematic block diagram of a system to provide advertising on a social network website by an electronic retailer according to an embodiment of the present invention.
Figure 6:
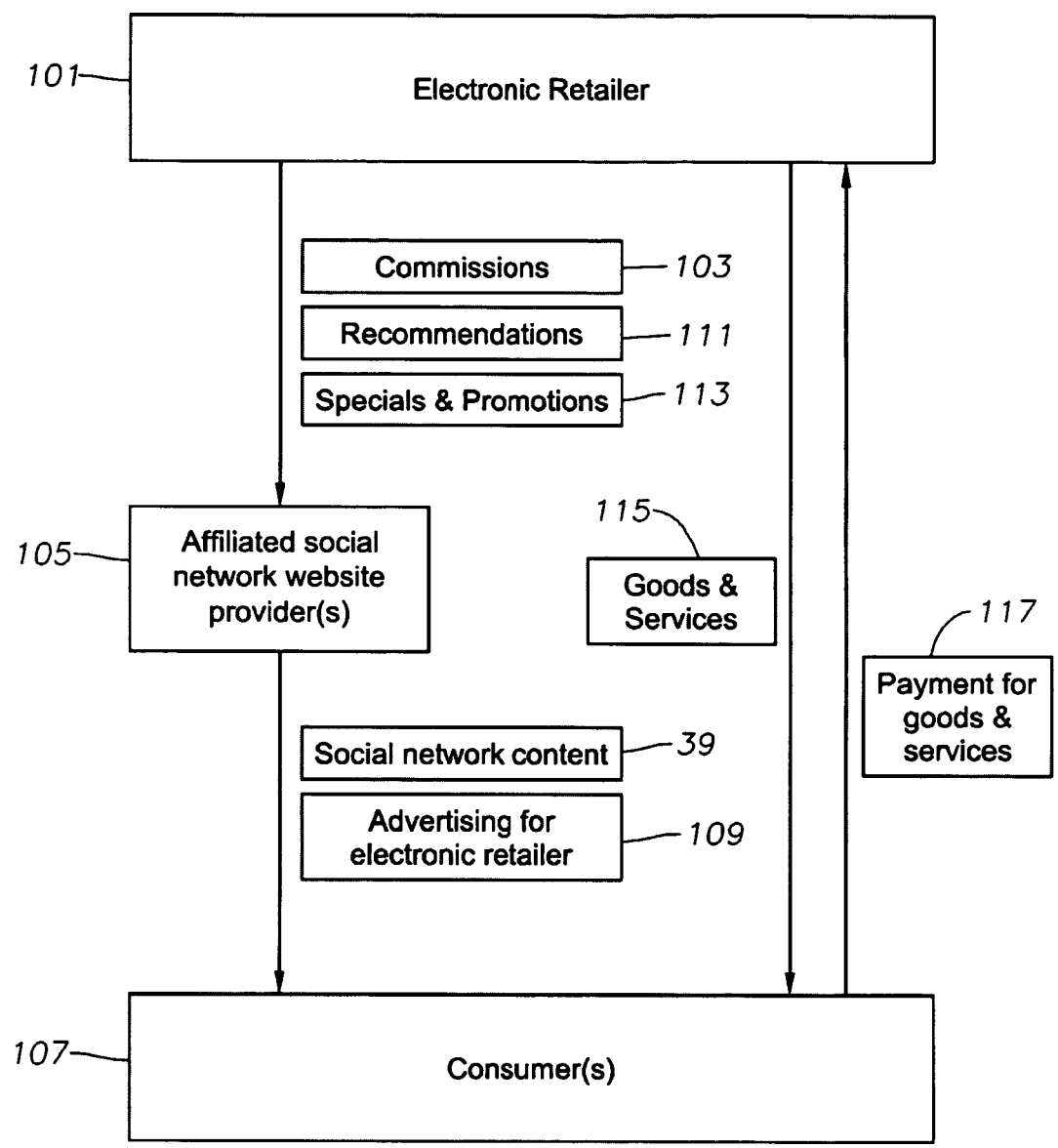
FIG. 6 is a schematic block diagram of a website affiliate program according to an embodiment of the present invention.

As illustrated in FIGS. 1 and 6, embodiments of the present invention include a system 30 for providing advertising on a social network website 37 by an electronic retailer 101. The system 30 includes a first computer, defining an electronic retailer computer 31. The electronic retailer computer 31 includes an electronic retailer website 33. The system 30 also includes one or more second computers, defining a social network website computer 35. The social network website computer 35 includes a social network website 37, which displays social network content 39 and a link 43 to the electronic retailer website 33. The social network content 39 can include, for example, a video segment with audio, a video segment without audio, an audio segment, a picture, text, or a combination thereof. The link 43 can include, for example, a hyper-text link associated with a product related text item embedded in the content 39 or an advertisement icon selectable by a customer.

Figure 2:
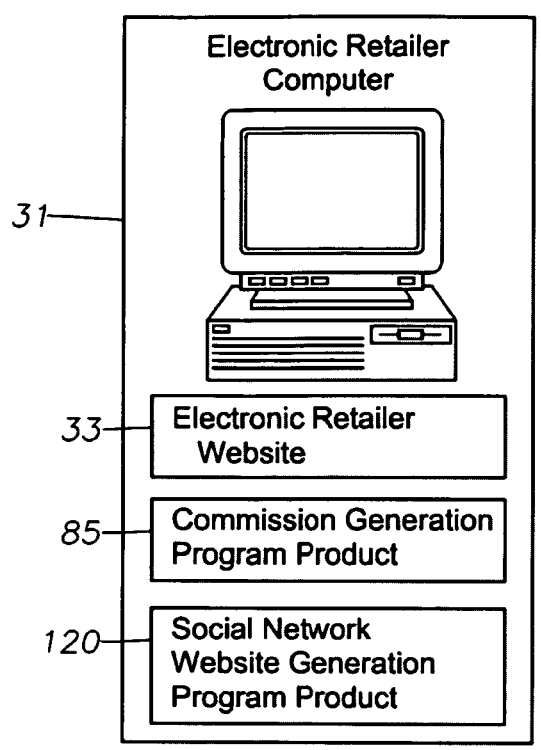
FIG. 2 is a schematic block diagram of an electronic retailer computer according to an embodiment of the present invention.

The system 30 further includes one or more third computers, defining a consumer computer 51. The electronic retailer computer 31, the social network website computer 35, and the consumer computer 51 are all positioned remote from each other and in communication with each other through an electronic communication network 53. The system 30 further includes program products, as illustrated, for example, in FIGS. 2, 3 and 4, associated with the social network website computer 35 and the electronic retailer computer 31.

Figure 3:
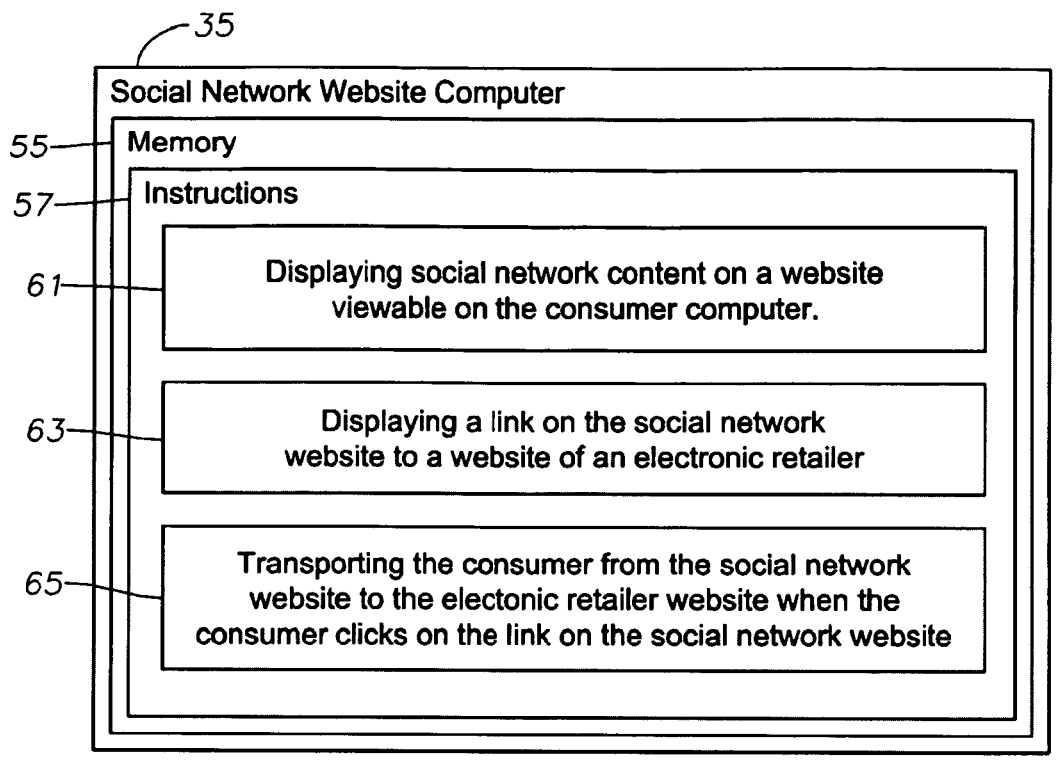
FIG. 3 is a schematic block diagram of a program product associated with a social network computer according to an embodiment of the present invention.

According to an embodiment of the present invention, the social network website computer 35 includes a program product, as illustrated in FIG. 3, located in a computer readable memory 55 that comprises a set of instructions 57 that, when executed by the computer 35, causes the computer to perform various operations. The operations include displaying social network content 39 on a website 37 viewable on the consumer computer 51 (block 61). The social network content 39 can include one or more of the following: a video segment with audio, a video segment without audio, an audio segment, a picture, and text. The operations further include displaying a link 43 on the social network website 37 to the electronic retailer website 33 (block 63). The operations also include rerouting the consumer from the social network website 37 to the electronic retailer website 33 when the consumer clicks on the link 43 on the social network website 37 (block 65).

Figure 4:
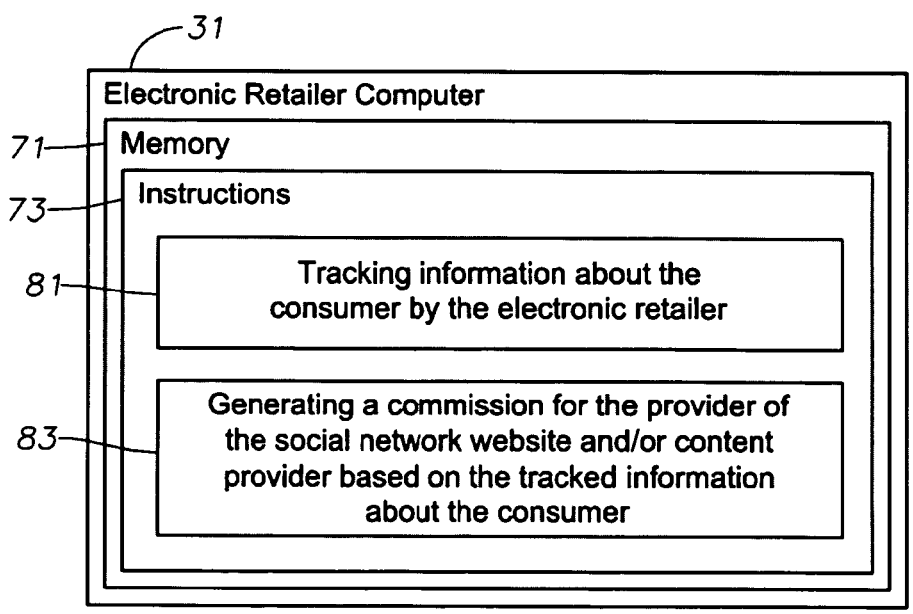
FIG. 4 is a schematic block diagram of a program product associated with an electronic retailer computer according to an embodiment of the present invention.

According to an embodiment of the present invention, the electronic retailer computer 31 includes a program product, as illustrated in FIG. 4, located in a computer readable memory 71 that comprises a set of instructions 73 that, when executed by the computer 31, causes the computer to perform various operations. The operations can include the electronic retailer tracking information 41 about the consumer, e.g., customer behavior (block 81). Such tracked information 41 can include the link 43 on the social network website 37 to an item or items for sale 45 clicked by the consumer, the duration of time the consumer spends viewing the linked electronic retailer website web page, the duration of time the consumer spends viewing other electronic retailer website web pages, movements by the consumer within the electronic retailer website 33, the number of times the consumer returns to the electronic retailer website 33 during an established time period (e.g., one week, two weeks, or 30 days, etc.), information regarding purchases by the consumer from the electronic retailer website 33, and other information as understood by those skilled in the art. The operations further include generating a commission for the provider of the social network website and/or content provider based on the tracked information about the consumer (block 83).

A person having ordinary skill in the art will recognize that various types of memory 55, 71, are readable by a computer. The memory 55, 71, can include volatile and nonvolatile memory known to those skilled in the art including, for example, RAM, ROM, and magnetic or optical disks, just to name a few. Note, it should also be understood that the illustrated computer/server configuration is given by way of example and that other types of computers or servers configured according to various other methodologies known to those skilled in the art can be used. The computers 31 and 35, shown schematically in, for example, FIG. 1 represents a computer, server, or computer/server cluster or farm and are not limited to any individual physical configuration. The various computer sites may be deployed as a computer/server farm or computer/server cluster managed by a serving hosting provider. The number of computers/servers and their architecture and configuration may be increased based on usage, demand and capacity requirements for the system 30.

According to an embodiment of the present invention, the instructions 73 are provided as part of a commission generation program product 85. Further, in an embodiment where the social network website 37 is generated by the electronic retailer 101, the commission generation program product 85, functioning across multiple computers 31, 35, can also include instructions 57. Note, the commission generation program product 85 can be in the form of microcode, programs, routines, and symbolic languages that provide a specific set for sets of ordered operations that control the functioning of the hardware and direct its operation, as known and understood by those skilled in the art. Note also, the commission generation program product 51, according to an embodiment of the present invention, need not reside in its entirety in volatile memory, but can be selectively loaded, as necessary, according to various methodologies as known and understood by those skilled in the art.

Figure 5:
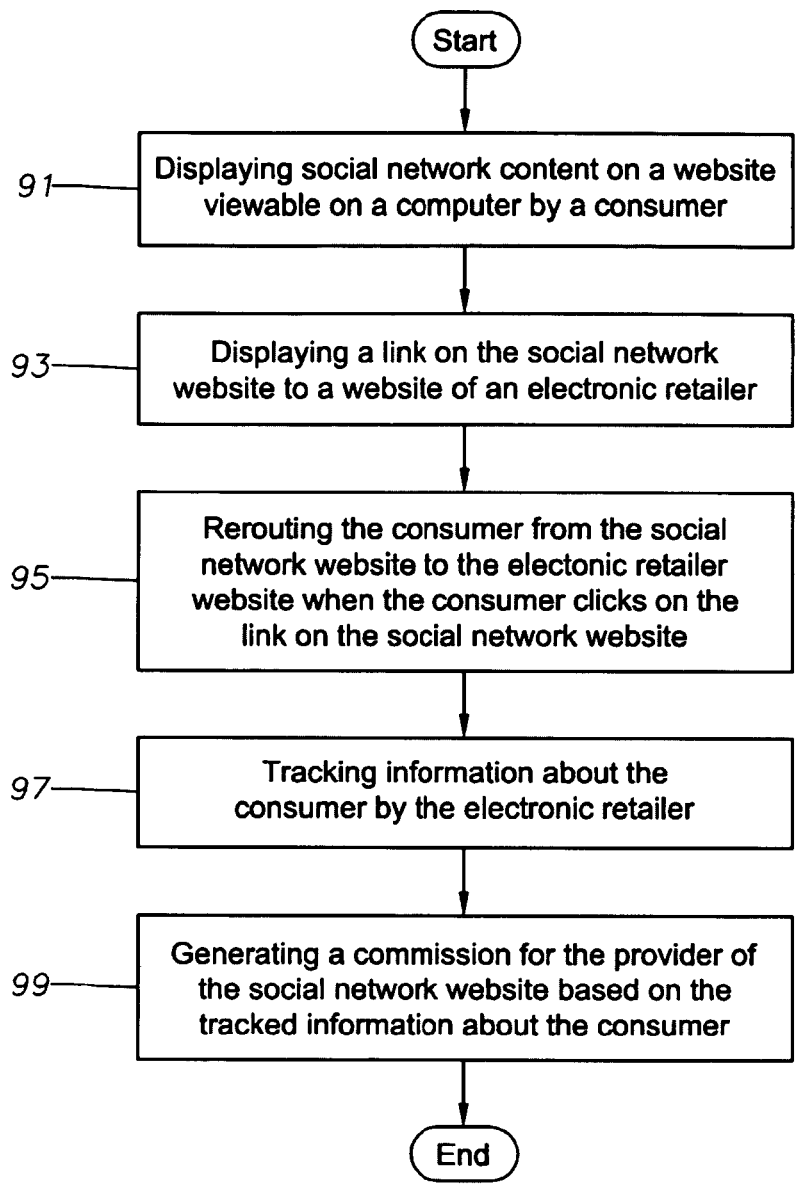
FIG. 5 is a schematic flow diagram of a method of advertising on a social network website by an electronic retailer according to an embodiment of the present invention.

As illustrated in FIG. 5, as well as FIGS. 1 and 6, an embodiment of the present invention provides a method of advertising on a social network website 37 by an electronic retailer. The method includes displaying social network content 39 on a social network website 37 viewable on a computer 51 by a consumer (block 91), as understood by those skilled in the art. The social network content 39 can include a video segment with audio, a video segment without audio, an audio segment, a picture, text, and/or a combination thereof.

The method further includes displaying a link 43 on the social network website 37 to an electronic retailer website 33 (block 93) and rerouting the consumer from the social network website 37 to the electronic retailer website 33 when the consumer clicks on the link 43 on the social network website 37 (block 95), as understood by those skilled in the art. The method continues with the electronic retailer tracking information about the consumer's behavior (block 97). Such tracked information 41 can include the link 43 on the social network website clicked by the consumer, the duration of time the consumer spends viewing one or more web pages of the electronic retailer website 33, movements by the consumer within the electronic retailer website 33, the number of times the consumer returns to the electronic retailer website 33 during an established time period, information regarding purchases by the consumer from the electronic retailer website 33, and/or other information as understood by those skilled in the art. Note, the tracked information 41 and the items for sale (indicia) 45 can be stored in one or more databases 47 which can be stored in memory 71 and/or memory of accessed through or otherwise associated with the database server 49.

As also shown in FIG. 6, in addition, the method also includes generating a commission 103 for the social network website provider 105 based on the tracked information 43 about the consumer 107 (block 99). That is, the method provides a model for advertising on a social network website 37 by an electronic retailer 31 that generates commissions 103 in response to actual consumer behavior, as opposed to relying exclusively on impressions or click-throughs, for this exemplary embodiment.

Figure 11:
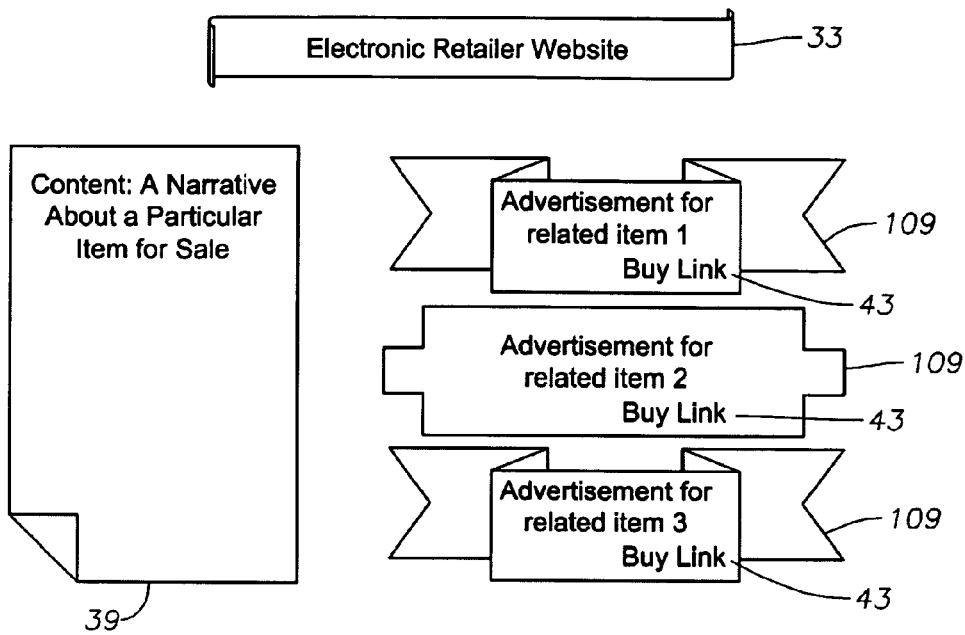
FIG. 11 is a partial schematic diagram of a website of a program product and system according to an embodiment of the present invention.
Figure 12:
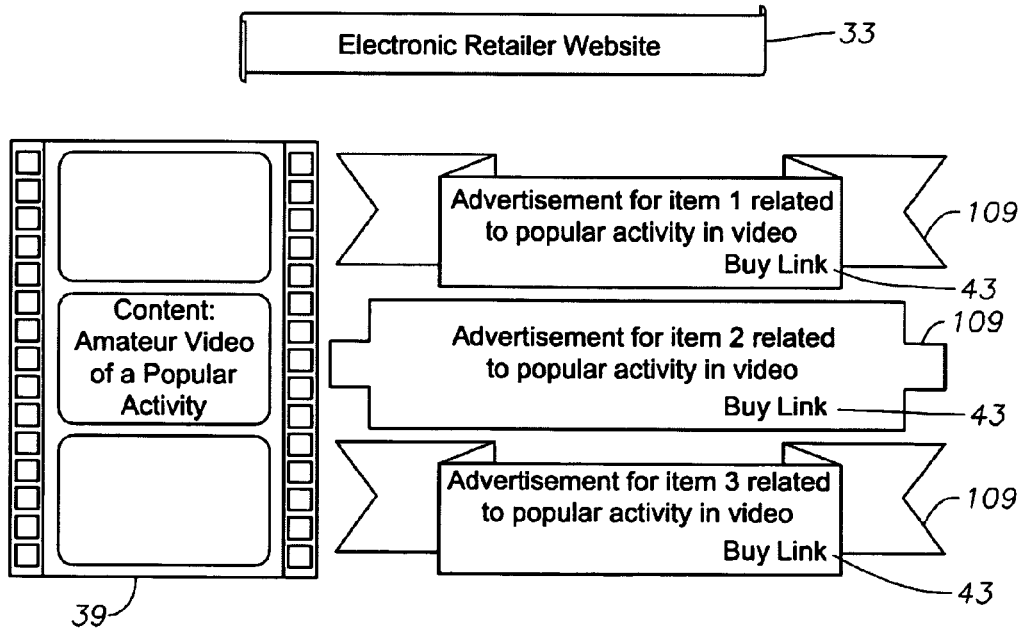
FIG. 12 is a partial schematic diagram of a website of a program product and system according to another embodiment of the present invention.

According to an embodiment of the present invention, the link 43 can be embedded within the social network content 39 (e.g., as Hypertext or as they picture icon), or the link 43 can be a textual or graphic part of an advertisement 109 and displayed adjacent the social network content 39, as shown, for example, in FIGS. 11-13. In addition, as understood by those skilled in the art, an advertisement containing the link 43 can feature a product (i.e., good or service item for sale 45) available from the electronic retailer 101 related to the social network content 39. That is, the product featured in the advertisement can be affiliated with one main subject of the social network content 39. As understood by those skilled in the art, the ability to target advertising by locating an advertisement within a relevant context, according to embodiments of the present invention, offers a tremendous benefit to advertisers.

According to an embodiment of the present invention, a search by a consumer 107 using a search engine can result in the displaying of the social network website 37 to the consumer 107. Because the social network website 37 provides a link 43 to the electronic retailer website 33, the search by a consumer 107 using a search engine can result in displaying to the consumer 107 links 43 to the electronic retailer website 33. Therefore, embodiments of the present invention include an electronic retailer 101 advantageously obtaining more favorable results from search engines as a function of advertising on social network websites 37.

According to an embodiment of the present invention and as understood by those skilled in the art, the step of rerouting the consumer 107 from the social network website 37 to the electronic retailer website 33 (block 95) can involve rerouting the consumer 107 to an appropriate section of the electronic retailer website 33, as determined by information contained within the link 43, based on a product, a product category, a brand, a price range, or a combination thereof. For example, if the one main subject of the social network content 39 concerns the proper method for training a pet dog, as discussed in an embodiment of the present invention above, the link 43 may contain information so that, when the link 43 is selected, the consumer is rerouted to the section of the electronic retailer website 33 devoted to the product category of dog collars and leashes, rather than the generic home page of the electronic retailer website 33.

Figure 7:
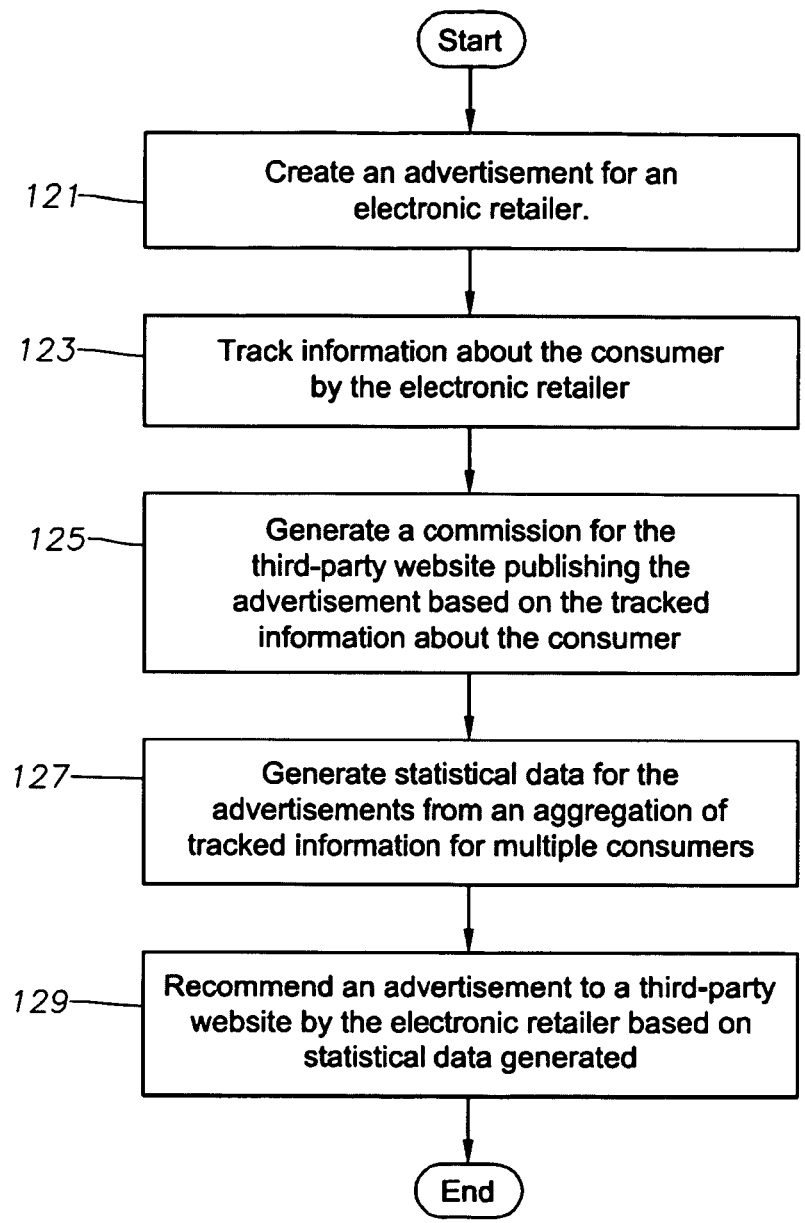
FIG. 7 is a schematic flow diagram of a method of advertising by an electronic retailer according to another embodiment of the present invention.

As illustrated in FIG. 7 and further in FIG. 6, a method of advertising by an electronic retailer 101, according to an example of an embodiment of the present invention, includes creating an advertisement for an electronic retailer for publication on a website (block 121), e.g., third party or retailer sponsored. The advertisement 109 can include a link 43 to reroute a consumer 107 to the electronic retailer website 33 when the consumer 107 clicks on the link 43 within the advertisement 109. The method continues tracking, e.g., behavioral information 41 about the consumer 107 by the electronic retailer 101 (block 123). Such tracked information 41 can include information identifying the third-party website (e.g., a third-party social network website 37) publishing the advertisement 109, the link 43 within the advertisement 109 clicked by the consumer 107, the duration of time the consumer 107 spends viewing the electronic retailer website 33, movements by the consumer 107 within the electronic retailer website 33, the number of times the consumer 107 returns to the electronic retailer website 33 during an established time period, information regarding purchases by the consumer 107 from the electronic retailer website 33, and/or other information as understood by those skilled in the art.

The method can further include generating a commission for the third-party website publishing the advertisement 109 based on the tracked information 41 about the consumer 107 (block 125). The method also can include generating statistical data for the advertisements 109 from an aggregation of tracked information 41 for multiple consumers 107 (block 127) and providing a recommendation 111 recommending an advertisement 109 to a third-party website by the electronic retailer 101 based on statistical data generated (block 129).

As perhaps best illustrated in FIGS. 6 and 13, an embodiment of the present invention provides a social network website 37 in which the social network content 39 is a narrative about a particular father-son fly fishing trip on a named river in a certain state. The narrative can also, for example, be illustrated by pictures taken during the trip. The social network website 37 can display adjacent the narrative, for example, an advertisement 109 for the rod and reel as used by the father in the narrative, the sleeping bag as used by the son, or a reservation to hire the services of the fishing guide's outfit. When a consumer 107 views the narrative on the social network website 37, clicks the link 43 in the advertisement 109 to purchase the rod and reel, is rerouted to the electronic retailer website 33, and completes a purchase, the provider of the social network website earns a sales commission 103 which can be generated through commission generation program product 85. In this embodiment, the provider of the social network website 37 is the son in the narrative and also the author of the content. In another embodiment, the social network website provider is an intermediary or owned by the electronic retailer 101, as described in more detail later.

FIGS. 1 and 5 illustrate a website affiliate program of social network website providers, according to an embodiment of the present invention, showing the relationships between an electronic retailer 101, affiliated social network website providers 105, and consumers 107. According to an embodiment of the present invention, the affiliated social network website providers 105 offer consumers 107, through one or more consumer computers 51 as understood by those skilled in the art, a social network website 33 including social network content 39 and advertising for the electronic retailer 101. The consumer 107 provides payment for goods and services 117 to the electronic retailer 101 for purchases made by the consumer by various techniques as understood by those skilled in the art. In exchange, the electronic retailer 101 provides to consumers 107 goods and services 115, as understood by those skilled in the art. The electronic retailer 101 provides to the affiliated social network website providers 105 commissions 103 in response to actual consumer behavior, as opposed to relying exclusively on impressions or click-throughs. In addition, the electronic retailer 101 offers recommendations 111 to the affiliated social network website providers 105 and access to specials and promotions 113. As an example, affiliated social network website providers 105 can be provided an exclusive availability to provide links 43 to products associated with an anticipated summer blockbuster, according to an embodiment of the present invention. The recommendations 111 from the electronic retailer 101 can include, for example, recommending a link 43 based on statistical data generated for the links 43 from an aggregation of tracked information 41 for multiple consumers 107.

Figure 8:
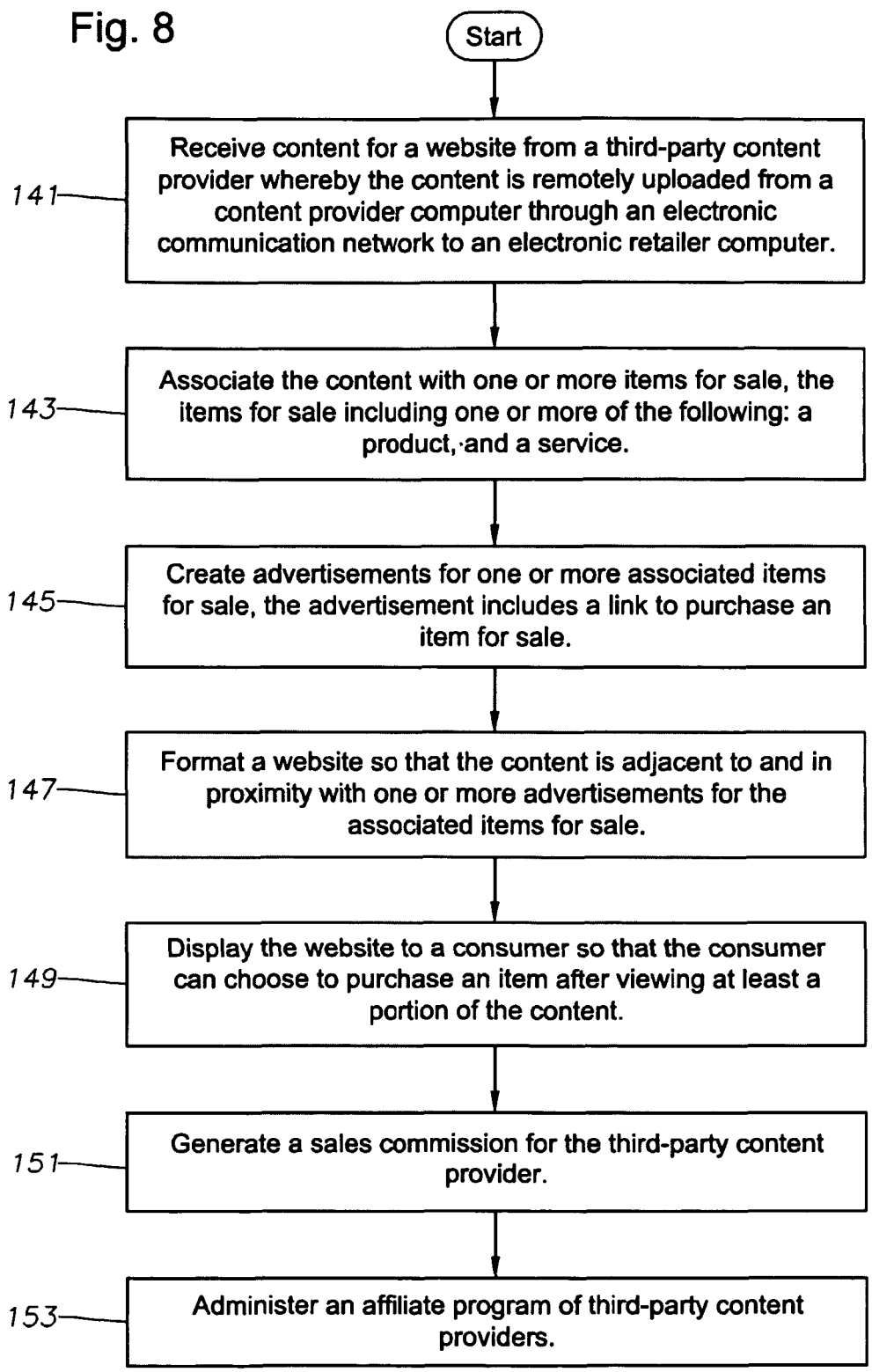
FIG. 8 is a schematic flow diagram of a process to incentivize content development for a website according to an embodiment of the present invention.
Figure 9:
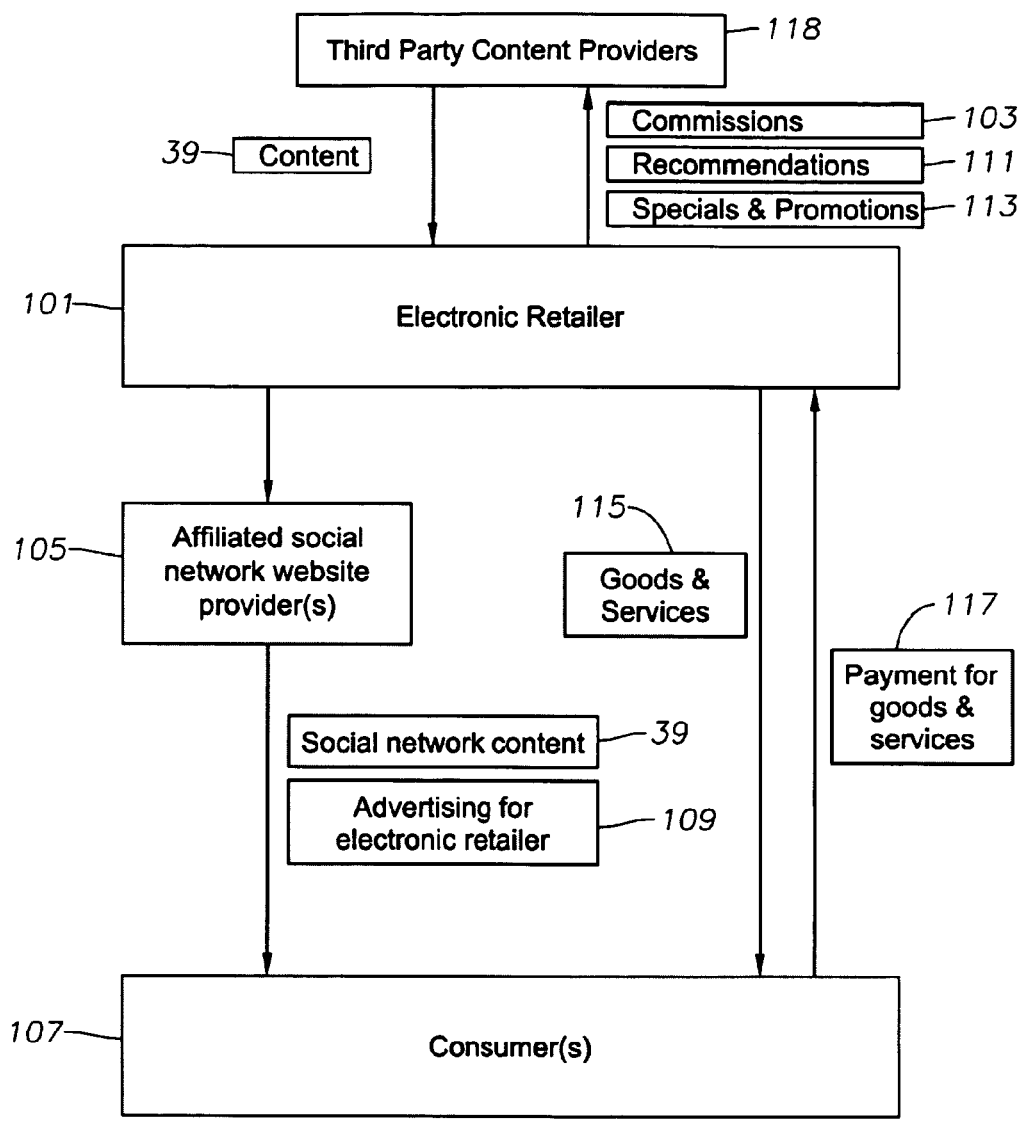
FIG. 9 is a schematic block diagram of a third-party content provider and website affiliate program according to an embodiment of the present invention.
Figure 10:
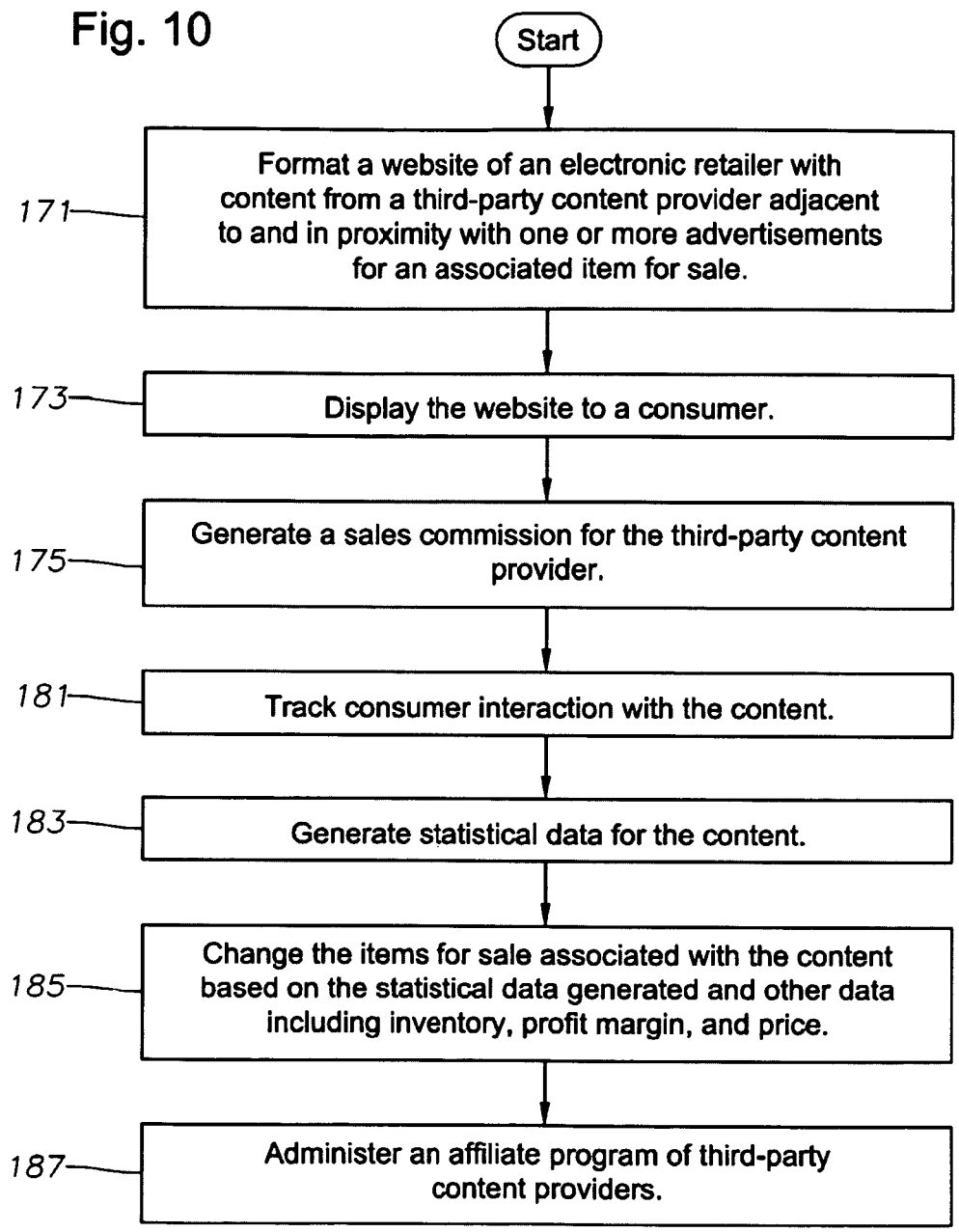
FIG. 10 is a schematic flow diagram of a process of generating web-based sales according to another embodiment of the present invention.

As illustrated in FIGS. 8-10, and further in FIG. 1, a system 30 and computer implemented method of advertising by an electronic retailer 101, according to an example of an embodiment of the present invention, includes additional components and procedures to incentivize social network content 39 development for the social network website 37. For example, according to an embodiment of the present invention, the system 30, in addition to including an electronic retailer computer 31 and one or more remote consumer computers 51, includes one or more remote third-party content provider computers 119. According to such an embodiment of the present invention, the electronic retailer computer 31, including a website generation program product 120 (FIG. 2) is in communication with, and receives content 39 from third-party content providers 118 via the content provider computers 119.

As perhaps best shown in FIG. 8 and further in FIG. 9, according to an embodiment of the present invention, the website generation program product 120, when executed by the electronic retailer computer 31, causes the computer 31 to perform the operations of receiving content 39 from a content provider computer 119 (block 141) and associating the content 39 with one or more items for sale (block 143) available according to the inventory of items for sale 32 (see FIG. 4). The operations also include creating advertisements 109 for the associated items for sale 45. An advertisement 109, for example, can include a link 43 to purchase an item for sale 45 (block 145). Then, the website generation program product 120 formats a website 37 so that the content 39 from the third-party content provider computer 119 is adjacent advertisements 109 for items for sale 45 from the electronic retailer 101 (block 147), such as in locations illustrated in FIGS. 11-13 or other adjacent locations as understood by those skilled in the art. Next, the social network website computer 35, through the consumer computer 51, displays the website 37 to a consumer 107 so that the consumer 107 can choose to purchase an item for sale 45 after viewing at least a portion of the content 39 (block 149). According to embodiments of the present invention, when a consumer 107 performs various behaviors associated with visiting or purchasing from the electronic retailer website 33, a sales commission for the third-party content provider 118 is automatically generated (block 151). According to another embodiment of the present invention, the operations further include administering an affiliate program of third-party content providers (block 153), similar to that previously described with respect to with third-party website providers 105.

As perhaps best shown in FIG. 10 and further in FIG. 9, a computer implemented method includes formatting a website 37 of an electronic retailer 101 with content 39 from a third-party content provider 118 adjacent one or more advertisements 109 for an associated item for sale 45 (block 171). Each advertisement has a link 43 to purchase an item for sale 45 so that a consumer 107 can choose to purchase an item for sale 45 after viewing at least a portion of the content 39. Next, the method includes displaying the website 37 to a consumer 107 (block 173). Then, the method also includes generating a sales commission 103 for the third-party content provider 118 (block 75) in response to various criteria, and such as, for example: producing the content 39 in association with the advertisement(s) 109 and link(s) 45; the consumer 107 purchasing the featured item for sale 45 through an advertisement 109 for an item for sale 45 associated with the content 39; the consumer 107 "clicking" the link 43 in the advertisement 109 for an item for sale 45 displayed adjacent the content 39 (which can be provided whether or not the consumer purchases the item for sale 45); and/or as a result of various consumer interactions with either the content 39 or with the electronic retailer website 33 (whether or not a purchase is ever made). In addition, embodiments of the present invention include tracking consumer interaction with the content 39 (block 181) and generating statistical data for the content 39 (block 183). Based on the statistical data generated and other data including inventory, profit margin, and price, the electronic retailer 101, for example, via the website generation program product 120 can responsively change the items for sale 45 associated with the content 39 (block 185). A person having ordinary skill in the art will understand that compelling content 39 can be used to promote multiple items for sale 45.

According to an embodiment of the present invention, the method can further provide for the administering an affiliate program of third-party content providers 118 (block 187). As illustrated, for example, in FIG. 9, as part of the affiliate incentive program, the third-party content providers 118 provide content 39 to the electronic retailer 101 in exchange for certain benefits, such as, commissions 103, access to specials and promotions 113, and branding and guidance recommendations 111 from the electronic retailer 101.

It is important to note that while various embodiments of the present invention have been described in the context of a fully functional system, those skilled in the art will appreciate that the mechanism of at least portions of the present invention and/or aspects thereof are capable of being distributed in the form of a computer readable medium of instructions in a variety of forms for execution on a processor, processors, or the like, and that embodiments of the present invention apply equally regardless of the particular type of signal bearing media used to actually carry out the distribution. Examples of computer readable media include but are not limited to: nonvolatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, flash drives, and other newer types of memories, and transmission type media such as digital and analog communication links. For example, such media can include both operating instructions and operations instructions related to the various program product and the method steps, described above.

Throughout this specification and as understood by those skilled in the art, the term "link" is defined as a reference to an online location, a pointer, a hypertext link, a hyperlink, or navigation element within a website to another section of the same website or to another website. Often, a link is embedded within text that is colored and underlined. Other links are embedded within icons or graphics. Typically, links are recognized by moving a cursor over the icon and having the cursor change visually, for example, from an arrow to a pointing finger, as understood by those skilled in the art. Link information can generally be accessed by, for example, right-clicking on the text or icon and selecting properties; alternately, hovering over a link may cause information to pop up and be displayed over the icon, text, or graphic, as understood by those skilled in the art. In addition, the term "rerouting" means directing, redirecting, or transporting the viewer from one a section of one website to another section of the same website or to another website, typically as a result of clicking on a link, as understood by those skilled in the art. Further, the terms "item for sale" and "product" refer to goods, services, and goods and services.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification.

That claimed is:

1. A computer implemented method of advertising on a social network website by an electronic retailer, the method comprising the steps of:
  receiving social network content from a third-party content provider computer at an electronic retailer computer of the electronic retailer;
  initiating a search of a database for products for sale using the electronic retailer computer responsive to receiving the social network content;
  automatically associating the social network content with one or more items for sale using the electronic retailer computer;
  automatically creating an advertisement for the one or more items for sale using the electronic retailer computer, the advertisement comprising a link to a webpage of the electronic retailer;
  automatically formatting a webpage such that the social network content and the advertisement are adjacent to one another;
  providing the webpage to a social network website from the electronic retailer computer;
  displaying the webpage with the social network content on the social network website viewable on a computer by a consumer, the social network content including one or more of the following: a video segment with audio, a video segment without audio, an audio segment, a picture, and text;
  displaying the advertisement adjacent the social network content on the webpage of the social network website;
  rerouting the consumer from the social network website to the electronic retailer webpage when the consumer clicks on the link on the social network website;
  tracking information about the consumer by the electronic retailer, the tracked information including:
    an indication of the link on the social network website clicked by the consumer,
    duration of time the consumer spends viewing the linked electronic retailer website web page,
    duration of time the consumer spends viewing other electronic retailer website web pages, number of times the consumer returns to the electronic retailer website during an established time period, movements by the consumer within the electronic retailer website, and information regarding purchases by the consumer from the electronic retailer website; and generating a commission for one or more of the following: a provider of the social network website and a provider of the social network content, based on the tracked information about the consumer, to thereby encourage additional display of additional social network content having at least one link to the electronic retailer website associated therewith.

2. A method as defined in claim 1, wherein the step of displaying social network content on a website viewable on a computer by a consumer is responsive to a search by a search engine; and wherein the linked electronic retailer website web page features a product identified as being used in context within the social network content.

3. A method as defined in claim 1, wherein the step of rerouting the consumer from the social network website to the electronic retailer website involves redirecting the consumer to an appropriate section of the electronic retailer website, as determined by information contained within the ink, based on one or more of the following: a product, a product category, a brand, and a price range.

4. A method as defined in claim 1, wherein the link is part of an advertisement, wherein the advertisement is displayed adjacent the social network content so that the consumer can view the advertisement at the same time as at least a portion of the social network content; wherein a product featured in the advertisement is affiliated with one main subjects of the social network content.

5. A method as defined in claim 1, wherein the method further comprises the steps of:

generating statistical data for an aggregation of tracked information for a multiple consumers responsive to the tracked information for a plurality of consumers; and recommending a second link to a particular product to the provider of a social network website by the electronic retailer for inclusion with the social network content, based on the generated statistical data.

6. A method as defined in claim 1, further comprising the step of:

administering a website affiliate program of social network website providers, the program involving the social network website providers advertising product on behalf of the electronic retailer to consumers in exchange for commissions, recommendations, and access to specials and promotions for affiliated social network website providers.

7. A method as defined in claim 1, wherein the link is a first link, the method further comprising the steps of:

generating statistical data for an aggregation of tracked information for multiple consumers responsive to the tracked information for a plurality of consumers; and recommending a second link to a particular product to the provider of the social network content by the electronic retailer for inclusion with the social network content, based on the generated statistical data.

8. A method of advertising by an electronic retailer, the method comprising the steps of:

receiving social network content from a third-party content provider computer at an electronic retailer computer of the electronic retailer;

initiating a search of a database for products for sale using the electronic retailer computer responsive to receiving the social network content;

automatically associating the social network content with one or more items for sale using the electronic retailer computer;

automatically creating an advertisement for the one or more items for sale using the electronic retailer computer, wherein the advertisement includes a link being positioned to reroute a consumer to a webpage of an electronic retailer website when the consumer clicks on the link within the advertisement;

automatically formatting a webpage such that the social network content and the advertisement are adjacent to one another;

providing the webpage for publication to a third-party website from the electronic retailer computer;

tracking information about the consumer using the electronic retailer computer, the tracked information including:

information identifying the third-party website publishing the advertisement, the link within the advertisement clicked by the consumer, duration of time the consumer spends viewing the electronic retailer website, movements by the consumer within the electronic retailer website, number of times the consumer returns to the electronic retailer website during an established time period, and information regarding purchases by the consumer from the electronic retailer website; and generating a commission for the third-party website publishing the advertisement based on the tracked information about the consumer to thereby encourage additional display of additional social network content having at least one link to the electronic retailer website associated therewith.

9. A method as defined in claim 8, wherein the advertisement is displayed on the third-party website adjacent the social network content so that the consumer can view the advertisement at the same time as at least a portion of the social network content;

wherein a product featured in the advertisement is affiliated with on main subject of the social network content;

wherein the social network content including one or more of the following: a video segment with audio, a video segment without audio, an audio segment, a picture, and text.

10. A method as defined in claim 8, further comprising the steps of:

generating statistical data for an aggregation of tracked information for multiple consumers responsive to the tracked information for a plurality of consumers; and recommending an advertisement for a particular product to a third-party website by the electronic retailer for inclusion with the social network content based on statistical data generated.

11. A system of advertising on a social network website by an electronic retailer, the system comprising:

a first computer being positioned to display an electronic retail website and defining an electronic retailer computer;

one or more second computers positioned remote from the first computer and in communication with the first computer through an electronic communication network, the one or more second computer being positioned to display a social network website and defining a social network website computer;
one or more third computers positioned remote from the first and second computers and in communication with the first and second computers through an electronic communication network and defining a consumer computer;
a first program product stored in a tangible computer medium that is readable by the social network website computer, the first program product comprising a set of instructions that, when executed by the social network website computer, cause the social network website computer to perform the following operations:
displaying social network content on a website viewable on a computer by a consumer, defining a social network website, the social network content including one or more of the following: a video segment with audio, a video segment without audio, an audio segment, a picture, and text,
displaying a link on the social network website to a web page of a website of an electronic retailer, and
rerouting the consumer from the social network website to the electronic retail website when the consumer clicks on the link on the social network website;
a second program product stored in a tangible computer medium that is readable by the electronic retailer computer, the second program product comprising a set of instructions that, when executed by the electronic retailer computer, cause the electronic retailer computer to perform the following operations:
tracking information about the consumer by the electronic retailer, the tracked information including:
an indication of the link on the social network website clicked by the consumer,
duration of time the consumer spends viewing the linked electronic retailer website web page,
duration of time the consumer spends viewing other electronic retailer website web pages,
number of times the consumer returns to the electronic retailer website during an established time period,
movements by the consumer within the electronic retailer website, and
information regarding purchases by the consumer from the electronic retailer website, and
generating a commission for one or more of the following: a provider of the social network website and a provider of the social network content, based on the tracked information about the consumer, to thereby encourage additional display of additional social network content having at least one link to the electronic retailer website associated therewith; and
a third program product defining a website generation program product stored in a tangible computer medium that is readable by the electronic retailer computer, website generation program product comprising a set of instructions that, when executed by the electronic retailer computer, cause the electronic retailer computer to perform the following operations:
receiving the social network content from the social network content provider,
initiating a search of a database for products for sale response to receiving the social network content to identify products related to the received social network content, and
responsively generating the social network website to include the social network content and an advertisement displayed adjacent the social network content so that that consumer can view the advertisement at the same time as at least a portion of the social network content;
wherein the link to the electronic retailer website web page featuring at least one product being affiliated with at least one main subject of the social network content.

12. A system as defined in claim 11,
wherein the operation of displaying social network content on a website viewable on consumer computer is a result of a search by a search engine;
wherein the linked electronic retailer website web page features a product identified as being used in context within the social network content;
wherein the operation of rerouting the consumer from the social network website to the electronic retailer website involves directing the consumer to an appropriate section of the electronic retailer website, as determined by information contained within the link, based on one or more of the following: a product, a product category, a brand, and a price range.

13. A system as defined in claim 11,
wherein the link is part of an advertisement;
wherein the advertisement is displayed adjacent the social network content so that the consumer can view the advertisement at the same time as at least a portion of the social network content;
wherein a product featured in this advertisement is affiliated with one main subjects of the social network content.

14. A system as defined in claim 11, wherein the link is a first link, and wherein the operations of the second program product further comprises:
generating statistical data for an aggregation of tracked information for a multiple consumers responsive to the tracked information for a plurality of consumers;
recommending a second link to a particular product to the provider of a social network website by the electronic retailer for inclusion with the social network content, based on the generated statistical data.

15. A system as defined in claim 11, wherein the link is a first link, and wherein the operations of the second program product further comprise:
generating statistical data for an aggregation of tracked information for multiple consumers responsive to the tracked information for a plurality of consumers;
recommending a second link to a particular product to the provider of the social network content by the electronic retailer for inclusion with the social network content, based on the generated statistical data.

16. Program product stored in a non-transitory tangible computer medium that is readable by a computer, the program product comprising a set of instructions that, when executed by the computer causes the computer to perform the following operations:
receiving social network content from a third-party content provider computer;
initiating a search of a database for products for sale responsive to receiving the social network content;
automatically associating the social network content with one or more items for sale;
automatically creating an advertisement for the one or more items for sale, the advertisement comprising a link to a webpage of the electronic retailer;
automatically formatting a webpage such that the social network content and the advertisement are adjacent to one another;

providing the webpage to a social network website;

displaying the social network content on the social network website viewable on a computer by a consumer, defining a social network website, the social network content including one or more of the following: a video segment with audio, a video segment without audio, an audio segment, a picture, and text;

displaying the advertisement on the social network website, wherein the advertisement is for a product affiliated with a main subject of the social network content selected for association therewith by one or more of the following: a provider of the social network website and a provider of the social network content, the advertisement displayed adjacent the social network content so that the consumer can view the advertisement at the same time as at least a portion of the social network content;

rerouting the consumer from the social network website to the electronic retail website when the consumer clicks on the link on the social network website;

tracking information about the consumer, the tracked information including:
  a duration of time the consumer spends viewing a specific electronic retailer website web page,
  a duration of time the consumer spends viewing other electronic retailer website web pages,
  movements by the consumer within an electronic retailer website,
  number of times the consumer returns to the electronic retailer website during an established time period, and
  information regarding purchases by the consumer from the electronic retailer website; and generating a commission based on the tracked information about the consumer.

17. Program Product as defined in claim 16, wherein the operation of displaying social network content on a website viewable on consumer computer is a result of a search by a search engine; and wherein the operation of rerouting the consumer from the social network website to the electronic retailer website involves directing the consumer to an appropriate section of the electronic retailer website, as determined by information contained within the link, based on one or more of the following: a product, a product category, a brand, and a price range.

18. Program product stored in a non-transitory tangible computer medium that is readable by a computer, the program product comprising a set of instructions that, when executed by the computer causes the computer to perform the following operations:

receiving social network content from a third-party content provider;

initiating a search of a database for products for sale responsive to receiving the social network content;

automatically associating the social network content with one or more items for sale;

automatically creating an advertisement for the one or more items for sale, the advertisement comprising a link to a webpage of the electronic retailer;

automatically formatting a webpage such that the social network content and the advertisement are adjacent to one another;

providing the webpage to a social network website;

tracking information about the consumer in response to the consumer selecting the advertisement on the social network website, including:
    an indication of the link on the social network website clicked by the consumer,
    duration of time the consumer spends viewing a specific electronic retailer website webpage;
    duration of time the consumer spends viewing other electronic retailer website web pages,
    movements by the consumer within the electronic retailer website,
    number of times the consumer returns to the electronic retailer website during an established time period, and
    information regarding purchases by the consumer from the electronic retailer website; and generating a commission for one or more of the following: a provider of the social network website and a provider of the social network content, based on the tracked information about the consumer, to thereby encourage additional display of additional social network content having at least one link to the electronic retailer website associated therewith.

19. Program product as defined in claim 18, wherein the link is a first link, and wherein the operations further comprises:

generating statistical data for an aggregation of tracked information for a multiple consumers responsive to the tracked information for a plurality of consumers;

recommending a second link to a particular product to the provider of a social network website by the electronic retailer for inclusion with the social network content, based on the generated statistical data.

20. Program product as defined in claim 18, wherein the operations further comprise:

generating statistical data for an aggregation of tracked information for multiple consumers responsive to the tracked information for a plurality of consumers recommending a link to a particular product to the provider of the social network content by the electronic retailer for inclusion with the social network content, based on the generated statistical data.

* * * * *